United States Patent
Mochizuki et al.

(10) Patent No.: US 10,569,661 B2
(45) Date of Patent: Feb. 25, 2020

(54) ELECTRIC-VEHICLE CONTROL DEVICE AND CONTROL METHOD

(71) Applicant: JATCO Ltd, Fuji-shi, Shizuoka (JP)

(72) Inventors: Tomoo Mochizuki, Isehara (JP); Kenichi Ooshima, Isehara (JP); Hiroshi Miyazaki, Yokohama (JP); Yuji Torizawa, Isehara (JP); Hiroki Matsui, Kanagawa (JP); Daisuke Nakagawa, Kanagawa (JP); Takefumi Suzuki, Kanagawa (JP)

(73) Assignee: JATCO LTD, Fuji-Shi (JP)

( * ) Notice: Subject to any disclaimer, the term of this patent is extended or adjusted under 35 U.S.C. 154(b) by 150 days.

(21) Appl. No.: 15/759,395

(22) PCT Filed: Nov. 15, 2016

(86) PCT No.: PCT/JP2016/083739
§ 371 (c)(1),
(2) Date: Mar. 12, 2018

(87) PCT Pub. No.: WO2017/090479
PCT Pub. Date: Jun. 1, 2017

(65) Prior Publication Data
US 2018/0264973 A1 Sep. 20, 2018

(30) Foreign Application Priority Data

Nov. 26, 2015 (JP) ................................ 2015-230721

(51) Int. Cl.
*B60W 10/08* (2006.01)
*B60L 15/20* (2006.01)
(Continued)

(52) U.S. Cl.
CPC ......... *B60L 15/2054* (2013.01); *B60W 10/02* (2013.01); *B60W 10/08* (2013.01);
(Continued)

(58) Field of Classification Search
CPC ........... B60L 15/20854; B60L 2240/48; B60L 15/20; B60W 30/18063; B60W 10/08;
(Continued)

(56) References Cited

U.S. PATENT DOCUMENTS

| 10,308,138 B2 * | 6/2019 | Meyer | B60W 20/15 |
| 2012/0109438 A1 * | 5/2012 | Akebono | B60K 6/48 701/22 |

(Continued)

FOREIGN PATENT DOCUMENTS

JP  2010-093990 A  4/2010

*Primary Examiner* — Roger L Pang
(74) *Attorney, Agent, or Firm* — Foley & Lardner LLP

(57) ABSTRACT

In a specific state where an electric vehicle is in a stop state and a creep torque is generate in an electric motor (2), when a shift range is switched from a traveling range to a non-traveling range, a motor control section (10B) performs a torque decrease control to stepwisely decrease the creep torque of the electric motor (2), and an automatic transmission control device (30) performs a disengagement control to gradually disengage the frictional engagement element of the automatic transmission (3).

7 Claims, 4 Drawing Sheets

(51) Int. Cl.
*B60W 10/02* (2006.01)
*B60W 30/18* (2012.01)
*B60W 20/40* (2016.01)

(52) U.S. Cl.
CPC .. *B60W 30/18063* (2013.01); *B60L 2240/423* (2013.01); *B60L 2240/48* (2013.01); *B60W 20/40* (2013.01); *B60W 2510/1005* (2013.01); *B60W 2520/04* (2013.01); *B60W 2540/10* (2013.01); *B60W 2540/12* (2013.01); *B60W 2710/021* (2013.01); *B60W 2710/083* (2013.01); *Y10S 903/914* (2013.01); *Y10T 477/26* (2015.01); *Y10T 477/32* (2015.01)

(58) Field of Classification Search
CPC ........... B60W 10/02; B60W 2710/083; B60W 2710/021; B60W 2540/12; B60W 2540/10; B60W 2520/04; B60W 2510/1005; B60W 20/40; B60W 20/50; B60W 50/0205; B60W 30/18054; Y10T 477/26; Y10T 477/32
See application file for complete search history.

(56) References Cited

U.S. PATENT DOCUMENTS

| | | | |
|---|---|---|---|
| 2013/0090799 A1* | 4/2013 | Nakamura | B60L 15/2063 701/22 |
| 2015/0298690 A1* | 10/2015 | Onouchi | B60L 50/16 701/22 |
| 2017/0174202 A1* | 6/2017 | Sasaki | B60W 10/18 |
| 2017/0232969 A1* | 8/2017 | Hunt | B60T 8/17 477/93 |

* cited by examiner

ELECTRIC-VEHICLE CONTROL DEVICE AND CONTROL METHOD

TECHNICAL FIELD

This invention relates to a control device and a control method for an electric vehicle including an electric motor serving as a driving source.

BACKGROUND ART

In a vehicle (electric vehicle) such as an electric vehicle using only an electric motor as a power source, and a hybrid vehicle using an engine (internal combustion engine) and an electric motor as power sources, which includes the electric motor serving as the power source, there is a vehicle arranged to simulate a creep torque generated by a torque converter of an automatic transmission in a vehicle using the engine as the driving source, to control a minute torque corresponding to the creep torque by the electric motor, to output this as the creep torque, and thereby to perform the creep traveling of the vehicle.

Moreover, in the electric vehicle which can perform the creep traveling, there is developed an art to cut the creep torque to suppress electricity consumption at the brake operation.

For example, a patent document 1 discloses an electric vehicle including a motor control section configured to generate the creep torque when a creep torque condition in which a selected shift range is a traveling range and an accelerator pedal is not operated is satisfied, and to perform a creep torque cut control to cut the creep torque when a creep cut condition in which the vehicle is stopped and the foot brake is operated is satisfied even when the creep torque condition is satisfied.

It can be judged whether or not the foot brake is operated, from information from a brake sensor arranged to sense whether or not the foot brake is operated. This brake sensor includes a stroke sensor arranged to sense a depression stroke amount of the brake pedal. It is possible to surely sense whether or not the foot brake is operated, by sensing a sensor stroke value (0 point, brake joint point) at which the brake hydraulic pressure is started to be increased by the depression of the brake pedal, and to apply (act) the brake.

This 0 point is varied in accordance with the variation of the brake with time, maintenance, and so on. Accordingly, this 0 point is periodically updated (renewed) by a stroke learning. It is possible to perform this stroke learning by reading a detection value of the stroke sensor at which the brake hydraulic pressure is started to be increased by actual operation of the foot brake.

In this case, there is developed an art to perform the stroke learning from a relational information of the brake hydraulic pressure and the detection value of the stroke sensor which is obtained by the operation of the foot brake along the ON state→the OFF state when the foot brake is operated along the ON state→the OFF state→the ON state after the start operation of the vehicle (the ON operation of the key switch).

By the way, in a case where the stroke learning of the brake sensor (the stroke sensor) is performed when the foot brake is operated along the ON state→the OFF state→the ON state after the start operation of the vehicle (the ON operation of the key switch) as described above, the detection signal of the brake sensor (the brake signal) is made invalid until the stroke learning is finished. With this, various controls are performed by using only the brake sensor information to which the result of the stroke learning is reflected. Accordingly, it is possible to appropriately perform the various controls.

However, in the vehicle in which the creep torque is generated at the satisfaction of the creep torque generation condition, and in which the creep torque is cut at the satisfaction of the creep cut condition as described above, the forward and rearward G variation is generated in the vehicle in a specific state, by using the only brake sensor information to which the result of the stroke learning is reflected. Consequently, the unnatural feeling is provided to the driver.

For analyzing the above-described phenomenon, for example, it is supposed that the key switch of the vehicle is operated to the ON state in the depression state of the brake pedal, and that the shift lever is operated to slowly switch the shift range from the P range through the R range to the N range. In this case, the foot brake is held to the ON state (depression state) after the start operation of the vehicle. Accordingly, the stroke learning is not performed. The brake signal is in the invalid state. The motor control section judges that the foot brake is not operated.

In this state, when the shift range is switched from the P range to the R range, the creep torque generation condition in which the shift range is the traveling range and the accelerator pedal is not operated is satisfied in the R range. The creep cut condition in which the vehicle is stopped and the foot brake is operated is not satisfied. Accordingly, the electric motor generates the creep torque.

In this R range, the distortion by the creep torque is stored in the drive shaft and so on of the vehicle. Then, when the shift range is switched to the N range, the creep torque of the electric motor is released, and the clutch engagement of the transmission is released. With these, the creep torque stored in the drive shaft and so on is suddenly released, so that the forward and rearward G variation is generated to the vehicle.

PRIOR ART DOCUMENT

Patent Document

Patent Document 1: Japanese Patent Application Publication No. 2010-93990

SUMMARY OF THE INVENTION

It is, therefore, an object of the present invention to provide a control device and a control method for an electric vehicle which is devised to solve the above-described problems, and to suppress the forward and rearward G variation generated in the vehicle when the shift range is switched to the non-traveling range in a case where the shift range is in the traveling range at the stop of the vehicle to store the creep torque in the drive shaft and so on.

(1) A control device for an electric vehicle according to the present invention, including an electric motor, and an automatic transmission including a frictional engagement element disposed in a power transmitting system between the electric motor and a driving wheel, and arranged to connect and disconnect a power, the control device comprises: a motor control means configured to generate a creep torque in the electric motor when a creep torque generation condition is satisfied, and to cut the creep torque when a creep cut condition is satisfied even when the creep torque generation condition is satisfied; a range selection means configured to select a shift range of the automatic transmission; and an automatic transmission control means configured to bring the frictional engagement element to an engagement state when a traveling range is selected in the range selection means, and to bring the frictional engagement element to a disengagement state when a non-traveling range is selected in the range selection means, the creep torque generation condition being a condition in which the shift range is the traveling range and the accelerator pedal is not operated, the creep cut condition being a condition in which the vehicle is stopped and a brake sensor outputs a brake operation detection signal, and when the shift range is switched from the traveling range to the non-traveling range in a specific state where the electric vehicle is in a stop state and the creep torque is generated in the electric motor, the motor control means being configured to perform a torque decrease control to stepwisely decrease the creep torque of the electric motor, and the automatic transmission control means being configured to perform a disengagement control to gently disengage the frictional engagement element.

(2) It is preferable that the automatic transmission control means is configured to perform the disengagement control while ensuring a transmission torque capacity to be greater than the decreased creep torque of the electric motor when the motor control means performs the torque decrease control.

(3) It is preferable that the motor control means is configured to decrease the creep torque of the electric motor in a two step manner, to decrease the creep torque to a half in a first step, and to decrease the creep torque to zero in a second step.

(4) It is preferable that the control device comprises a brake characteristic update means configured to learn and update an output characteristic of the brake senor in accordance with a predetermined operation of the foot brake which is performed after a start operation of the electric vehicle; and the brake characteristic update means is configured to make the output of the brake sensor invalid until the brake characteristic update means learns and updates the output of the brake sensor after the start operation.

(5) It is preferable that the frictional engagement element is a hydraulically actuated element arranged to be actuated by a hydraulic pressure supplied to and discharged from a hydraulic chamber; a manual valve and a pressure regulating valve are provided in this order from an upstream side in a hydraulic passage arranged to supply the hydraulic pressure from a hydraulic pressure source to the hydraulic chamber; the manual valve is mechanically connected to the shift lever; the pressure regulating valve is arranged to regulate an actual pressure of the oil within the hydraulic chamber in accordance with a command pressure; and the automatic transmission control means is configured to perform the disengagement control to decrease the actual pressure by providing the command pressure according to the variation characteristic of the actual pressure by which the frictional engagement element is gently disengaged.

(6) It is preferable that in a case where the shift range is switched from one of forward and rearward traveling ranges to the non-traveling range, the torque decrease control and the disengagement control are stopped to immediately bring the creep torque of the electric motor to zero, and the frictional engagement element is disengaged when the shift range is switched from the non-traveling range to the other of the forward and rearward traveling ranges.

(7) A control method for an electric vehicle according to the present invention, including an electric motor, and an automatic transmission including a frictional engagement element disposed in a power transmitting system between the electric motor and a driving wheel, and arranged to connect and disconnect a power, the control method comprises: a motor control configured to generate a creep torque in the electric motor when a creep torque generation condition is satisfied, and to cut the creep torque when a creep cut condition is satisfied even when the creep torque generation condition is satisfied; an automatic transmission control configured to bring the frictional engagement element to an engagement state when a traveling range is selected in the range selection means configured to select a shift range of the automatic transmission, and to bring the frictional engagement element to a disengagement state when a non-traveling range is selected in the range selection means, the creep torque generation condition being a condition in which the shift range is the traveling range and the accelerator pedal is not operated, and the creep cut condition being a condition in which the vehicle is stopped and a brake sensor outputs a brake operation detection signal, a judgment step of judging whether or not the vehicle is in a specific state where the creep torque is generated in the electric motor in an engagement state of the frictional engagement element in a stop state of the electric vehicle; and a control step of stepwisely decreasing the creep torque of the electric motor, and performing a disengagement control to gently disengage the frictional engagement element when the shift range is switched from the traveling range to the non-traveling range in the specific state.

By the present invention, when the shift range is switched from the traveling range to the non-traveling range in the specific state in which the electric vehicle is in the stop state and the creep torque is generated in the electric motor, the torque decrease control to stepwisely decrease the creep torque of the electric motor is performed. Moreover, the disengagement control to gently disengage the frictional engagement element is performed. Accordingly, it is possible to suppress the forward and rearward G variation generated in the vehicle at the release of the creep torque stored in the power transmission system in the specific state.

DESCRIPTION OF EMBODIMENTS

Hereinafter, an embodiment according to the present invention is explained with reference to the drawings. Besides, a below-described embodiment is merely example. It is not intended to exclude various variations and applications of the art which are not described in the below-described embodiment. Configurations in the below-described embodiment can be varied as long as they are not deviated from the gist of the invention. Moreover, they can be selected and combined if necessary.

[1. Power Train Configuration]

Figure 1:
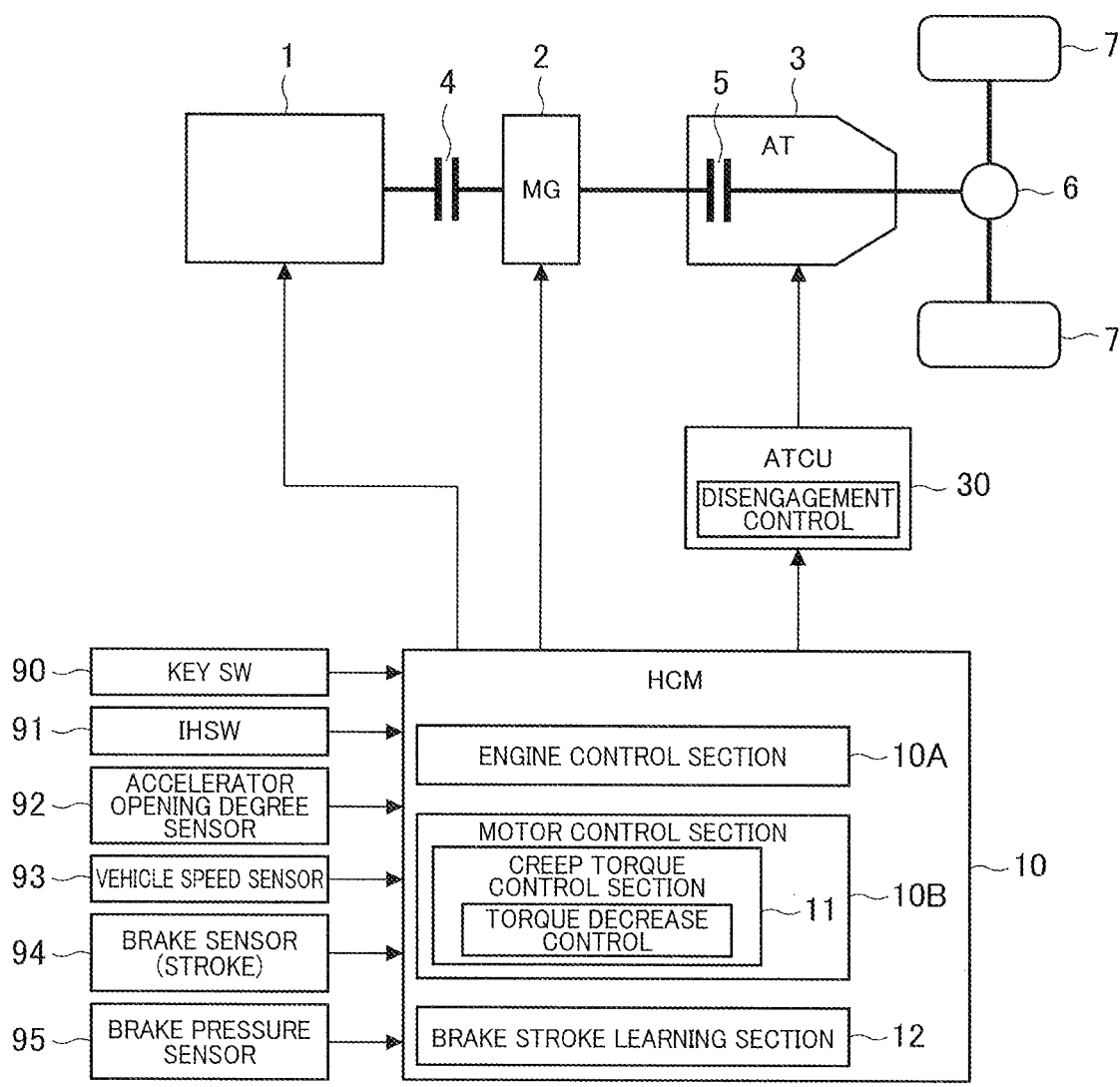
FIG. 1 is a configuration view showing a power train of an electric vehicle and a control device for the power train in one embodiment of the present invention.

FIG. 1 is a configuration view showing a power train (power transmitting system) for an electric vehicle to which a control device according to the embodiment is applied, and that control device. As shown in FIG. 1, this electric vehicle is a hybrid vehicle including an engine (internal combustion engine) 1; a motor generator (an electric motor with a power generation function) 2; an automatic transmission 3; a first clutch 4; a second clutch 5; a differential gear 6; and driving wheels 7 and 7.

That is, this hybrid vehicle has a power train configuration including the engine 1, the motor generator (hereinafter, referred also to as MG) 2, and the two clutches 4 and 5. The hybrid vehicle has an HEV mode attained by an engagement of the first clutch 4, and an EV mode attained by a disengagement of the first clutch 4.

An output shaft of the engine 1 and an input shaft of MG2 are connected with each other through a first clutch (hereinafter, referred also to as CL1) 4 arranged to vary a torque capacity. Moreover, an output shaft of the MG2 and an input shaft of the automatic transmission (hereinafter, referred also to as AT) 3 are connected with each other. An output shaft of the automatic transmission 3 is connected through the differential gear 6 to the driving wheels 7 and 7.

The second clutch (hereinafter, referred to also as CL2) 5 is mounted in the automatic transmission 3. The second clutch 5 is a plurality of frictional engagement elements (clutch or brake) which is arranged to vary a torque capacity, and to be engaged or disengaged in accordance with a gear stage selected in accordance with a traveling state of the vehicle when a shift range is set to a traveling range (for example, a D range, an R range and so on) by an operation of the shift lever 8.

In the HEV mode, the first clutch 4 is engaged. The automatic transmission 3 is arranged to composite (synthesize) a power of the engine 1 which is inputted through the first clutch 4, and a power inputted from the motor generator 2, by the second clutch 5, and to output the power to the driving wheels 7 and 7. Moreover, in the EV mode, the first clutch 4 is disengaged. The automatic transmission 3 is arranged to output the power inputted from the motor generator 2 to the driving wheels 7 and 7 by the second clutch 5.

The first clutch 4 and the second clutch 5 are, for example, wet type multiple plate clutches in which an oil flow rate and a hydraulic pressure can be continuously controlled by proportional solenoid valves.

In the second clutch 5, a hydraulic passage which is connected to an oil pump 51 (cf. FIG. 2) which is a hydraulic source is controlled to be opened and closed in accordance with the selected range by a manual valve 52 (cf. FIG. 2) mechanically connected to the shift lever 8.

[1.1. Configuration of Hydraulic Pressure Supply System of Second Clutch]

Figure 2:
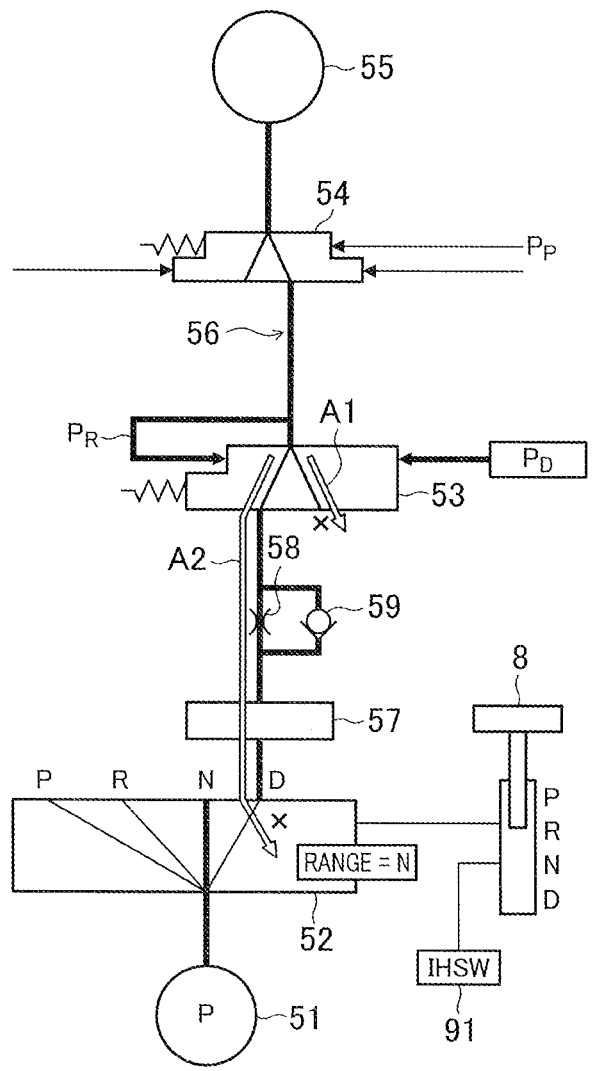
FIG. 2 is a hydraulic circuit showing a configuration of a hydraulic pressure system of an automatic transmission of the electric vehicle according to the embodiment of the present invention.

FIG. 2 is a hydraulic circuit of a hydraulic pressure supply system for supplying the hydraulic pressure to the low brake which is one of the second clutch 5. As shown in FIG. 2, this hydraulic circuit includes the oil pump 51; the manual valve 52 mechanically connected to the shift lever 8; a pressure regulating valve 53 arranged to regulate the hydraulic pressure; a switching valve 54; a hydraulic is chamber 55 of the low brake; and an oil passage 56 which extends from the oil pump 51 to the hydraulic chamber 55, and in which the manual valve 52, the pressure regulating valve 53, and the switching valve 54 are disposed in this order from an upstream side.

Moreover, a filter 57 is disposed in the oil passage 56 on an outlet side of the manual valve 52. Moreover, the oil passage 56 is bifurcated in parallel manner between the filter 57 and the pressure regulating valve 53. An orifice 58 (throttling) 58 is disposed in one oil passage. One way valve (check ball) 59 is disposed in the other oil passage. The one way valve 59 is arranged to allow only a flow of the oil from the manual valve 52 toward the pressure regulating valve 53. The oil rapidly flows from the manual valve 52 side toward the pressure regulating valve 53 side. The oil gently flows from the pressure regulating valve 53 side toward the manual valve 52 side.

When the shift lever 8 is operated to switch the shift range from the non-traveling range (a P range or an N range) to the traveling range (the R range or the D range) at the stop of the vehicle (stopped state) after the start operation, the manual valve 52 is arranged to supply the oil discharged from the oil pump 51 by the hydraulic pressure level according to the traveling range, to the pressure regulating valve 53 side. In case of the D range, the switching valve 54 is brought to the hydraulic pressure supply position by the pilot pressure $P_P$, so that the hydraulic pressure for engaging the low brake is supplied to the hydraulic chamber 55.

In this case, the hydraulic pressure on the hydraulic chamber 55 side is regulated by the pressure regulating valve 53 in accordance with the low brake command pressure $P_D$ supplied to the pressure regulating valve 53. When the command pressure $P_D$ is smaller than the actual pressure $P_R$, the pressure regulating valve 53 is brought to a position to drain the hydraulic pressure on the hydraulic chamber 55 side, as shown by a hollow arrow A1. When the command pressure $P_D$ is greater than the actual pressure $P_R$, the pressure regulating valve 53 is brought to a position to introduce the hydraulic pressure of the D range pressure supplied from the manual valve 52 to the hydraulic chamber 55 side. Moreover, when the command pressure $P_D$ is in a range to be equal to the actual pressure $P_R$, the pressure regulating valve 53 does not connect the hydraulic passage 56 to the hydraulic chamber 55. Moreover, the pressure regulating valve 53 does not drain the hydraulic pressure on the hydraulic chamber 55 side. The pressure regulating valve 53 is brought to a closing position to hold the hydraulic pressure on the hydraulic chamber 55 side.

In a case where the shift lever 8 is operated to switch the shift range from the traveling range (the R range or the D range) to the N range of the non-traveling range at the stop of the vehicle, the manual valve 52 is arranged to shut off the supply of the oil discharged from the oil pump 51 to the pressure regulating valve 53 side. Moreover, except for a specific state described later, the pilot pressure $P_P$ is removed, and the switching valve 54 is brought to a position to drain the hydraulic pressure on the hydraulic chamber 55 side.

[2. Control Device for Electric Vehicle]

Next, a control device for a vehicle provided with the above-described power train is explained.

As shown in FIG. 1, the control device for this vehicle includes a hybrid control module (HCM) 10 configured to control the overall power train; an automatic transmission control unit (ATCU as an automatic transmission control means) 30 configured to control the automatic transmission 3 under the control of the hybrid control module 10.

The HCM 10 has functions to perform various controls for the vehicle. In particular, the HCM 10 includes a function (engine control section) 10A configured to control the engine 1; and a function (a motor control section as a motor control means) 10B configured to control the motor generator 2. The HCM is configured to perform the integral control of the engine 1 and the motor generator 2. Furthermore, the HCM 10 includes a function (brake stroke learning section) 12 configured to perform a learning control of the brake stroke. Moreover, the HCM 10 is configured to transmit information relating to the shift, to the ATCU 30.

The HCM 10 is connected to a key switch 90, an inhibitor switch (IHSW) 91, an accelerator opening degree sensor 92, a vehicle speed sensor 94, a brake pressure sensor 95, and so on. The inhibitor switch 91 is arranged to sense the shift position of the shift lever 8, and to output the shift range signal according to the shift range. The accelerator opening degree sensor 92 is arranged to sense an operation amount (accelerator opening degree) of the accelerator pedal. The vehicle speed sensor 93 is arranged to sense the vehicle speed. The brake sensor 94 is arranged to sense an operation amount (brake stroke) of a foot brake. The brake pressure sensor 95 is arranged to sense the brake hydraulic pressure. The HCM 10 receives the detection information of these sensors.

The motor control section 10B of the HCM 10 includes a creep torque control section 11 configured to generate the creep torque in the motor generator 2 when a creep torque generation condition is satisfied, and to perform a creep torque cut control to cut the creep torque of the motor generator 2 when a creep cut condition is satisfied even in a case where the creep torque generation condition is satisfied.

The creep torque generation condition is a condition in which the shift range is the traveling range (for example, the D range and the R range), and in which the accelerator pedal is not operated. The creep torque control section 11 is configured to judge whether or not this condition is satisfied based on the detection signals of the IHSW 91 and the accelerator opening degree sensor 92.

Moreover, the creep cut condition is a condition in which the vehicle is stopped, and in which the foot brake is operated. The creep torque control section 11 is configured to judge whether or not this condition is satisfied based on the detection signals of the vehicle speed sensor 93 and the brake sensor 94. In a case where the creep cut condition is satisfied, the creep cut control is performed to cut the creep torque even when the creep torque generation condition is satisfied.

The brake stroke learning section 12 is configured to perform a stroke learning of the brake sensor 94 when the key switch 90 is switched to the ON state (READY-On), and the foot brake is operated along the ON state→the OFF state→the ON state.

That is, the stroke learning of the brake sensor 94 learns the stroke sensor value (0 point, brake joint point) at which the brake hydraulic pressure is started to be increased by the depression of the brake pedal to start to apply (act) the brake, and the stroke sensor value at which the brake hydraulic pressure is decreased to be zero by the depression release (return) of the brake pedal. It is possible to obtain the brake hydraulic pressure at this time as the detection value from the brake pressure sensor 95.

Accordingly, the stroke sensor value at which the brake is started to be applied is stored at the depression of the brake pedal by which the foot brake is operated from the OFF state to the ON state. The stroke sensor value at which the brake hydraulic pressure is decreased to zero is stored at the depression release of the brake pedal by which the foot brake is switched from the ON state to the OFF state after the above-described state. Then, when the foot brake is switched from the OFF state to the ON state, the 0 point of the brake sensor (the stroke sensor) 94 is calculated based on the stored stroke sensor values, and updated and stored.

The brake stroke learning section 12 is configured to learn and update the stroke sensor value at every timings when the key switch 90 is operated to the ON state. With this, it is possible to appropriately grasp (know) the operation state of the brake from the signal sensed by the brake sensor 94.

Moreover, the HCM 10 is configured to make the output of the brake sensor 94 invalid until the 0 point of the brake sensor 94 is updated after the brake stroke learning section 12 finishes the learning after the key switch 90 is switched to the ON state. That is, the only information of the stroke sensor value which is learned and updated is valid. With this, the operation state of the brake is not inappropriately grasped from the detection signal from the detection signal of the brake sensor 94 which is the signal before the learning and the update.

[3. Torque Decrease Control and Disengagement Control in Specific State]

The control device is configured to perform a specific control relating to the creep torque of the motor generator 2. That is, when the shift range is switched from the traveling range to the non-traveling range in the specific state where the creep torque is generated in the motor generator 2 in the stop state of the electric vehicle in the engagement state of the second clutch 5, the motor control section 10*b* is configured to perform the torque decrease control by which the creep torque of the motor generator 2 is stepwisely decreased. Moreover, the ATCU 30 is configured to perform the disengagement control by which the second clutch 5 is gently disengaged.

It is supposed that the specific state is a state where the key switch of the vehicle is switched to the ON state, and the shift lever 8 is operated to slowly switch the shift range from the P range through the R range to the N range in a state where the brake pedal is depressed (of course, the accelerator pedal is not operated).

Besides, it is possible to suppose, as the specific state, a state where the shift lever 8 is operated to rapidly switch the shift range through the P range, the R range, and the N range to the D range, and then to switch to the N range in a state where the brake pedal is depressed without operating the accelerator pedal.

In these cases, the foot brake is held to the ON state after the operation of the start of the vehicle. Accordingly, the brake stroke learning section 12 does not perform the stroke learning yet. Consequently, the detection signal of the brake sensor 94 (the brake operation detection signal, abbreviated as the brake signal) is made invalid.

In this state, the creep torque generation condition is satisfied while the shift range is in the traveling range of the R range and the D range, and the creep cut condition is not satisfied. Accordingly, the motor control section 10B generates the creep torque to the motor generator 2 while the shift range is in the traveling range. In this case, when the shift range is switched from the traveling range to the N range of the non-traveling range, the creep torque generation condition is not satisfied. Accordingly, the creep torque is cut. The ATCU 30 disengages the second clutch 5 of the automatic transmission 3 in accordance with the non-traveling range.

Conventionally, the creep torque cut and the disengagement of the second clutch 5 at this time are immediately performed. In this control device, the motor control section 10B stepwisely decreases the creep torque by the torque decrease control. The ATCU 30 gently disengages the second clutch 5 by the disengagement control.

In the above-described specific state, the creep torque is stored in the power train while the shift range is in the traveling range. Accordingly, in a case where the instantaneous creep torque cut and the instantaneous disengagement of the second clutch 5 are performed in accordance with the switching to the non-traveling, the forward and rearward G variation is generated due to the torque stored in the power train to provide the large unnatural feeling to the driver. The above-described control is performed for avoiding this.

Figure 3:
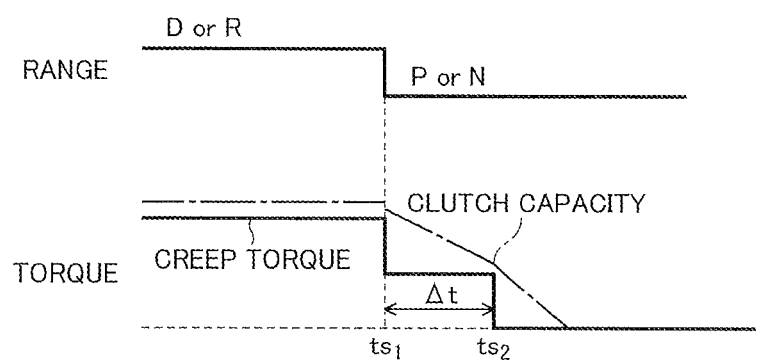
FIG. 3 is a time chart showing a characteristic of a control of the electric vehicle according to the embodiment of the present invention.

FIG. 3 is a time chart for explaining the torque decrease control and the disengagement control in this embodiment.

In the toque decrease control, the creep torque is decreased in the two step manner, as shown in FIG. 3. That is, at time $t_{S1}$ when the shift range is switched to the non-traveling range, the creep torque is decreased to the half in a first step decrease. At time $t_{S2}$ after a predetermined time period, the creep torque is decreased to zero in a second step decrease.

In the disengagement control, the second clutch 5 is gently disengaged in parallel with this torque decrease control while ensuring the transmission torque capacity greater than the decreased creep torque. In particular, it is supposed that a hydraulic pressure variation characteristic is a characteristic in which the actual pressure $P_R$ of the hydraulic chamber 55 is gradually decreased by the leakage in a state where the manual valve 52 is in the open position in accordance with the switching of shift range to the N range. The command pressure $P_D$ corresponding to this hydraulic pressure variation characteristic is provided to the pressure regulating valve 53. With this, it is possible to gently disengage the second clutch 5 while ensuring the transmission torque capacity greater than the creep torque.

When the command pressure $P_D$ of the pressure regulating valve 53 is in the region to be equal to the actual pressure $P_R$, the pressure regulating valve 53 is in the closing position to close the hydraulic passage 56. That is, the pressure regulating valve 53 suppress the discharge of the hydraulic pressure on the hydraulic chamber 55 side from the manual valve 52 which is in the open position through the hydraulic passage 56. Moreover, the pressure regulating valve 53 does not drain the hydraulic pressure on the hydraulic chamber 55 side. Accordingly, the decrease of the hydraulic pressure on the hydraulic chamber 55 side is suppressed to the leakage amount from the pressure regulating valve 53. Accordingly, it is possible to gently disengage the second clutch 5 while ensuring the transmission torque capacity greater than the creep torque. Besides, in this specific state, the pilot pressure $P_P$ is held to hold the switching valve 54 to the hydraulic pressure supply position even when the select lever 8 becomes the non-traveling range, so that the connection between the hydraulic chamber 55 and the pressure regulating valve 53 is ensured. Accordingly, when the command pressure $P_D$ is smaller than the actual pressure $P_R$, the hydraulic pressure on the hydraulic chamber 55 side is gently decreased in the path connected to the orifice 58, as shown by a hollow arrow A2 of FIG. 2. However, when the command pressure $P_D$ of the pressure regulating valve 53 is in the region to be equal to the actual pressure $P_R$, the pressure regulating valve 53 is in the closing position, so that the hydraulic pressure on the hydraulic chamber 55 side is further gently decreased relative to the above-described case.

As shown in FIG. 3, the actual pressure $P_R$ is decreased in the stepped manner by the minute amount at the time $t_{S1}$ when the manual valve 52 is brought to the open position.

Accordingly, the command pressure $P_D$ is decreased in the stepped manner by the minute amount. Thereafter, the command pressure $P_D$ is decreased by a linear inclination. However, the linear inclination is slightly increased near the time $t_{S2}$ when the second stepped decrease of the creep torque is performed. This is because it is possible to finish the disengagement of the second clutch 5 at the early timing since there is little influence to the suppress of the forward and rearward G variation even when the disengagement speed of the second clutch 5 is slightly increased near the time $t_{S2}$.

Besides, while the torque decrease control and the disengagement control are performed in a case where the shift range is switched from one of the traveling ranges of the D range and the R range to the N range, the motor control section 10B and the ATCU 30 stop the torque decrease control and the disengagement control to immediately bring the creep torque of the motor generator 2 to zero, and to immediately disengage the second clutch 5 when the shift range is switched from the N range to the other of the traveling ranges of the D range and the R range. Furthermore, when the shift range is switched (returned) to the same traveling range (the one of the traveling ranges), the motor control section 10B and the ATCU 30 similarly stop the torque decrease control and the disengagement control to immediately bring the creep torque of the motor generator 2 to zero, and to immediately disengage the second clutch 5.

[4. Operations and Effects]

Figure 4:
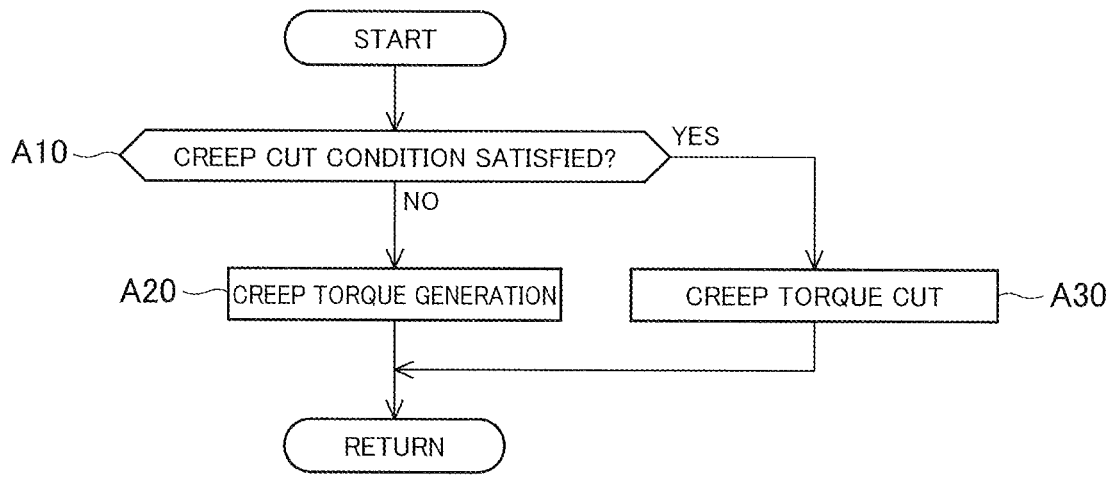
FIG. 4 is a flowchart for explaining a creep torque control of the electric vehicle according to the embodiment of the present invention.
Figure 5:
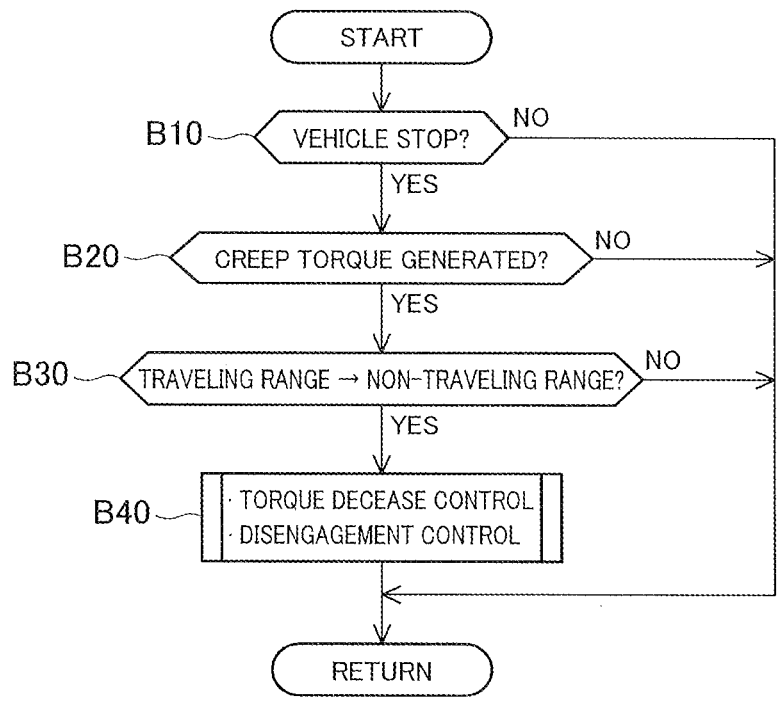
FIG. 5 is a flowchart for explaining a control in a specific state of the electric vehicle according to the embodiment of the present invention.

The control device for the electric vehicle according to the one embodiment of the present invention is constructed as described above. For example, the creep torque cut control is performed as shown in FIG. 4, and the torque decrease control and the disengagement control are performed as shown in FIG. 5. Besides, the operations of FIG. 4 and FIG. 5 are started when the key switch of the vehicle is operated to the ON state, and finished when the key switch of the vehicle is operated to the OFF state. The operations of FIG. 4 and FIG. 5 are performed at a predetermined control cycle.

In the creep torque control cut, it is judged whether or not the creep cut condition is satisfied (step A10), as shown in FIG. 4, in a case where the creep torque is applied. In particular, it is judged whether or not the vehicle is stopped, and the foot brake is operated in a state where the shift range is in the traveling range and the accelerator pedal is not operated.

In this case, when the creep cut condition is satisfied, the creep torque is not generated (the creep torque cut) (step A30). On the other hand, when the creep cut condition is not satisfied, the creep torque is generated in the motor generator 2 (step 20).

Moreover, in the torque decrease control and the disengagement control, it is firstly judged whether or not the vehicle is stopped from the information of the vehicle speed sensor 93, as shown in FIG. 5 (step B10, judgment step). When the vehicle is not stopped, the process is returned. When the vehicle is stopped, it is judged whether or not the creep torque is generated from the control information of the motor control section 10B (step B20, the judgment step). In this case, when the creep torque is not generated, the process is returned.

On the other hand, in a case where it is judged that the creep torque is generated at step B20, it is the specific state where the vehicle is stopped and the creep torque is generated. In this specific state, the creep torque is stored in the power train. Next, it is judged whether or not the shift range is switched from the traveling range to the non-traveling range (step B30). When the shift range is not switched from the traveling range to the non-traveling range, the process is returned.

On the other hand, when it is judged that the shift range is switched from the traveling range to the non-traveling range at step B30, the torque decrease control to stepwisely decrease the creep torque of the motor generator 2 is performed. The automatic transmission control means performs the disengagement control to gently disengage the second clutch 5 (step B40, a control step).

Figure 6:
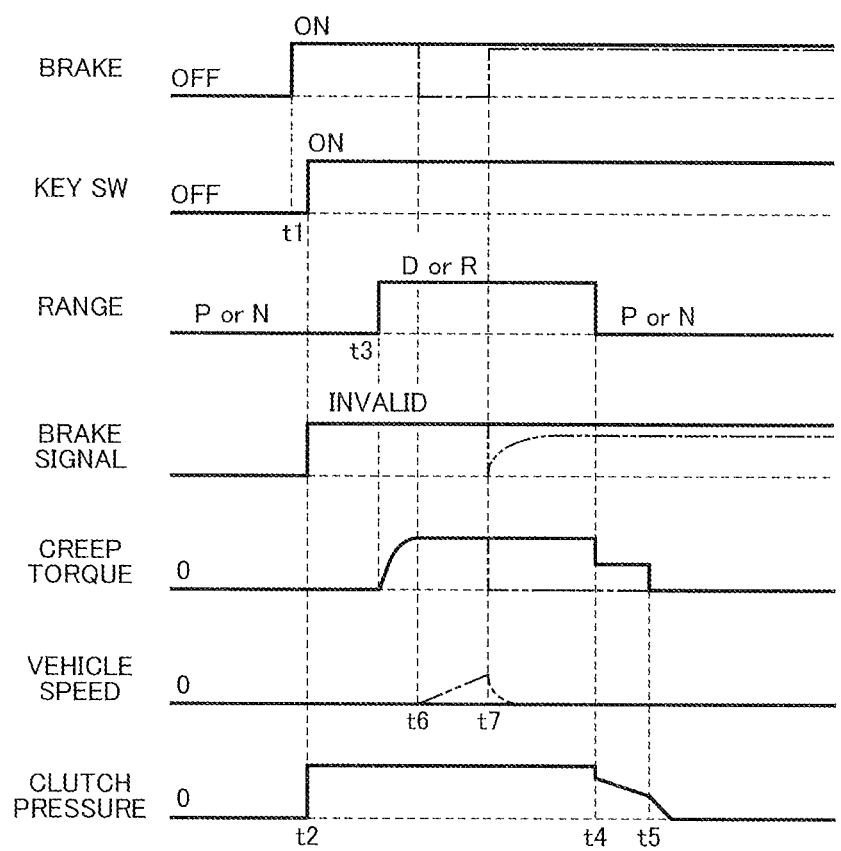
FIG. 6 is a time chart showing a control of the electric vehicle according to the embodiment of the present invention.

FIG. 6 is a time chart showing the control of the electric vehicle according to the embodiment. The torque decrease control and the disengagement control in the specific state are explained with reference to FIG. 6.

As shown in FIG. 6, the foot brake is operated at time t1 (the ON state). The key switch is operated to the ON state at time t2 while the above-described state is maintained. Then, when the shift range is switched from the non-traveling range (the P range or the N range) to the traveling range (the R range or the D range) at time t3, the creep torque generation condition is satisfied, so that the creep torque is generated. While the brake is continued to be operated, the output of the brake sensor 94 is invalid, so that the creep cut condition is not satisfied. Moreover, the vehicle is maintained in the stop state.

Then, the shift range is switched from the traveling range to the non-traveling range at time t4. The torque decrease control to stepwisely decrease the creep torque is performed from the time t4. Moreover, the disengagement control to gently disengage the second clutch 5 is performed. In this embodiment, the creep torque is decreased to the half at the time t4. The creep torque is decreased to zero at time t5. Furthermore, in the disengagement control, as shown as the clutch pressure, the second clutch 5 is gently disengaged from time t4 to time t5 by the gentle inclination, and gently disengaged from time t5 by the steeper inclination angle slightly steeper than the gentle inclination, while ensuring the transmission torque capacity to be greater than the decreased creep torque.

Besides, for example, when the foot brake is released at time t6 as shown by two dot chain line of FIG. 6, the vehicle is started to be moved (cf. the vehicle speed shown by the two dot chain line). Then, when the foot brake is operated again at time t7 as shown by the two dot chain line, the learning control of the brake sensor 94 is performed. The output of the brake sensor 94 becomes valid (effective). As shown after time t7, the brake signal is outputted in accordance with the hydraulic pressure. The creep cut condition is satisfied. The creep torque is cut to zero. At this time, the second clutch 5 is held to the engagement state. The forward and rearward G variation of the vehicle is not generated.

As described above, in a case where the creep torque of the motor generator 2 is immediately brought to zero and the second clutch 5 is immediately disengaged when the shift range is switched from the traveling range to the non-traveling range in the specific state where the creep torque is stored in the power train, the creep torque stored in the power train is immediately released. With this, the forward and rearward G variation of the vehicle may be generated to provide the unnatural feeling to the driver and the occupant of the vehicle. However, in the device according to the present invention, the creep torque is stepwisely decreased so that the second clutch 5 is gently disengaged. Accordingly, it is possible to suppress the generation of the forward and rearward G variation of the vehicle, and to suppress the possibility of the unnatural feeing to the driver and the occupant of the vehicle.

In the torque decrease control according to this embodiment, the creep torque is decreased in the two stepped manner. Accordingly, it is possible to suppress the generation of the forward and rearward G variation of the vehicle by the simple control.

Moreover, in the disengagement control performed in parallel with this torque decrease control, the second clutch 5 is gently disengaged while ensuring the transmission torque capacity to be greater than the decreased creep torque. Accordingly, at least in a first half of the disengagement control, it is possible to suppress the release of the creep torque in the second clutch 5. This release of the creep torque in the second clutch 5 is a large cause of the generation of the forward and rearward G of the vehicle. However, it is possible to surely suppress the generation of the forward and rearward G variation of the vehicle.

Besides, in this case, it is supposed that the specific state is generated since the brake signal before the learning control of the brake sensor is invalid. However, the specific state is a state where the vehicle is stopped and the creep torque is generated. This state is not limited to the state where the brake signal before the learning control of the brake sensor is invalid. Even when the specific state is generated due to any causes, in a case where the creep torque of the motor generator 2 is immediately brought to zero and the second clutch 5 is immediately disengaged when the shift range is switched from the traveling range to the non-traveling range in the specific state, the generation of the forward and rearward G variation may be caused to provide the unnatural feeing. Accordingly, it is effective to employ the torque decrease control and the disengagement control according to the present invention.

However, the torque decrease control and the disengagement control may be applied only to a case where the specific state is generated since the brake signal before the learning control of the brake sensor is invalid, by limiting the specific state to the timing before the learning control of the brake sensor.

[5. Others]

Hereinbefore, the embodiment according to the present invention is explained. However, the present invention is not limited to the above-described embodiment. Various variations of the embodiment are applicable as long as it is not deviated from the gist of the present invention.

For example, in the above-described embodiment, when the shift range is switched from the traveling range to the non-traveling range in the specific state where the vehicle is stopped and the creep torque is generated, the torque decrease control and the disengagement control are performed. However, when the specific state is during a short time period, the storage of the creep torque is small. Accordingly, the generation of the forward and rearward G variation of the vehicle may be small, so that there is no problem. In consideration of the above-described case, the torque decrease control and the disengagement control may be performed in a case where the shift range is switched from the traveling range to the non-traveling range when the specific state is continued during a predetermined time period or more.

Furthermore, in the above-described embodiment, the electric vehicle is the hybrid vehicle using the engine and the electric motor as the power source. The electric vehicle according to the present invention may be an electric vehicle using the only electric motor as the power source.

Moreover, in the above-described embodiment, the frictional engagement element is the hydraulically-actuated clutch. The present invention is applicable to any frictional engagement elements such as an electromagnetic frictional engagement element as long as it is the frictional engagement element arranged to vary the transmission torque capacity.

Besides, in the above-described embodiment, in the torque decrease control, the creep torque of the electric motor is decreased in the two step manner. However, in the torque decrease control, it is sufficient that the creep torque of the electric motor is stepwisely decreased. In the torque decrease control, the creep torque of the electric motor may be decreased in multiple step manner as long as the creep torque is gradually decreased.

The invention claimed is:

1. A control device for an electric vehicle including an electric motor, and an automatic transmission including a frictional engagement element disposed in a power transmitting system between the electric motor and a driving wheel, and arranged to connect and disconnect a power, the control device comprising:
  a motor control section configured to generate a creep torque in the electric motor when a creep torque generation condition is satisfied, and to cut the creep torque when a creep cut condition is satisfied even when the creep torque generation condition is satisfied;
  a range selection section configured to select a shift range of the automatic transmission; and
  an automatic transmission control section configured to bring the frictional engagement element to an engagement state when a traveling range is selected in the range selection section, and to bring the frictional engagement element to a disengagement state when a non-traveling range is selected in the range selection section,
  the creep torque generation condition being a condition in which the shift range is the traveling range and the accelerator pedal is not operated,
  the creep cut condition being a condition in which the vehicle is stopped and a brake sensor outputs a brake operation detection signal, and
  when the shift range is switched from the traveling range to the non-traveling range in a specific state where the electric vehicle is in a stop state and the creep torque is generated in the electric motor, the motor control section being configured to perform a torque decrease control to stepwisely decrease the creep torque of the electric motor, and the automatic transmission control section being configured to perform a disengagement control to gently disengage the frictional engagement element.

2. The control device for the electric vehicle as claimed in claim 1, wherein the automatic transmission control section is configured to perform the disengagement control while ensuring a transmission torque capacity to be greater than the decreased creep torque of the electric motor when the motor control section performs the torque decrease control.

3. The control device for the electric vehicle as claimed in claim 1, wherein the motor control section is configured to decrease the creep torque of the electric motor in a two step manner, to decrease the creep torque to a half in a first step, and to decrease the creep torque to zero in a second step.

4. The control device for the electric vehicle as claimed in claim 1, wherein the control device comprises a brake characteristic update section configured to learn and update an output characteristic of the brake sensor in accordance with a predetermined operation of the foot brake which is performed after a start operation of the electric vehicle; and the brake characteristic update section is configured to make the output of the brake sensor invalid until the brake characteristic update section learns and updates the output of the brake sensor after the start operation.

5. The control device for the electric vehicle as claimed in claim 1, wherein the frictional engagement element is a hydraulically actuated element arranged to be actuated by a hydraulic pressure supplied to and discharged from a hydraulic chamber; a manual valve and a pressure regulating valve are provided in this order from an upstream side in a hydraulic passage arranged to supply the hydraulic pressure from a hydraulic pressure source to the hydraulic chamber; the manual valve is mechanically connected to the shift lever; the pressure regulating valve is arranged to regulate an actual pressure of the oil within the hydraulic chamber in accordance with a command pressure; and the automatic transmission control section is configured to perform the disengagement control to decrease the actual pressure by providing the command pressure according to the variation characteristic of the actual pressure by which the frictional engagement element is gently disengaged.

6. The control device for the electric vehicle as claimed in claim 1, wherein in a case where the shift range is switched from one of forward and rearward traveling ranges to the non-traveling range, the torque decrease control and the disengagement control are stopped to immediately bring the creep torque of the electric motor to zero, and the frictional engagement element is disengaged when the shift range is switched from the non-traveling range to the other of the forward and rearward traveling ranges.

7. A control method for an electric vehicle including an electric motor, and an automatic transmission including a frictional engagement element disposed in a power transmitting system between the electric motor and a driving wheel, and arranged to connect and disconnect a power, the control method comprising:
  a motor control configured to generate a creep torque in the electric motor when a creep torque generation condition is satisfied, and to cut the creep torque when a creep cut condition is satisfied even when the creep torque generation condition is satisfied;
  an automatic transmission control configured to bring the frictional engagement element to an engagement state when a traveling range is selected in the range selection section configured to select a shift range of the automatic transmission, and to bring the frictional engagement element to a disengagement state when a non-traveling range is selected in the range selection section,
  the creep torque generation condition being a condition in which the shift range is the traveling range and the accelerator pedal is not operated, and
  the creep cut condition being a condition in which the vehicle is stopped and a brake sensor outputs a brake operation detection signal,
  a judgment step of judging whether or not the vehicle is in a specific state where the creep torque is generated in the electric motor in an engagement state of the frictional engagement element in a stop state of the electric vehicle; and
  a control step of stepwisely decreasing the creep torque of the electric motor, and performing a disengagement control to gently disengage the frictional engagement element when the shift range is switched from the traveling range to the non-traveling range in the specific state.

* * * * *